J. P. FEGELY.
BRAKE MECHANISM.
APPLICATION FILED DEC. 10, 1920.
1,386,559. Patented Aug. 2, 1921.
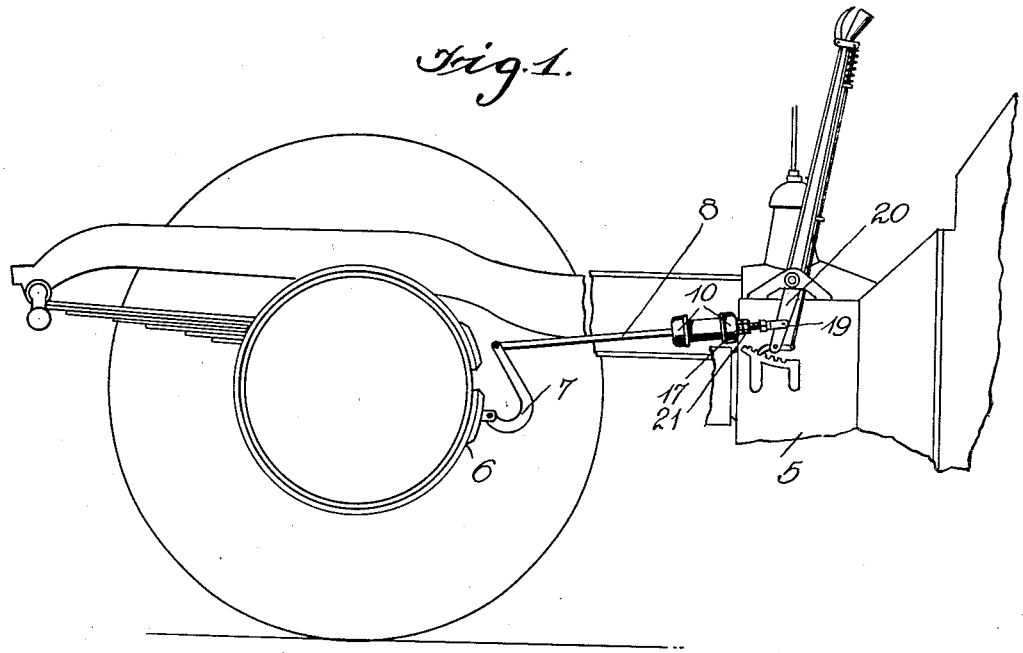
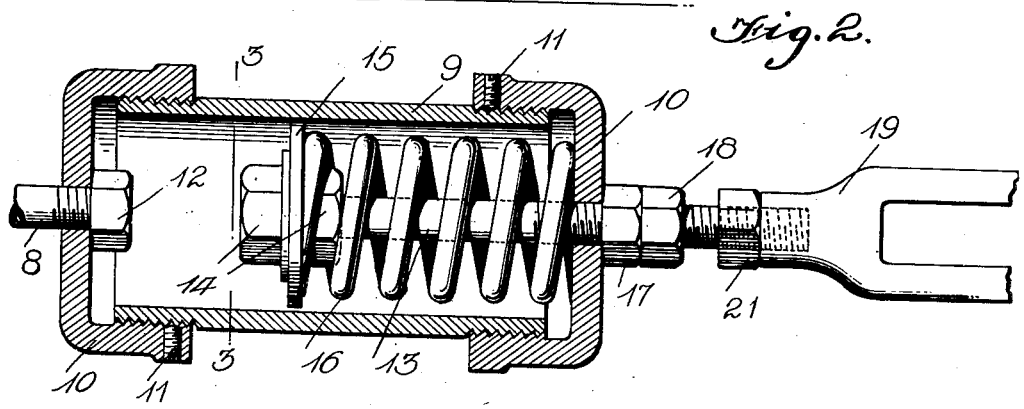
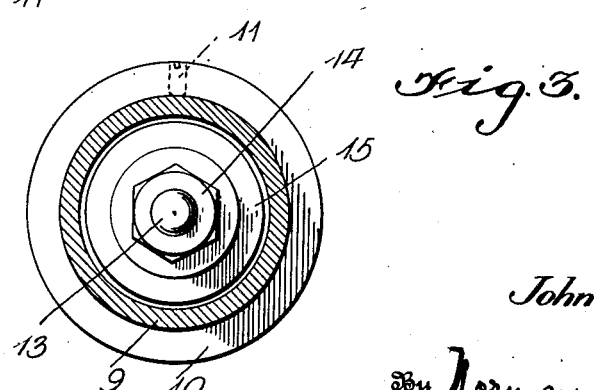
Inventor
John P. Fegely
By Norman J. Whitaker
his Attorney

UNITED STATES PATENT OFFICE.

JOHN P. FEGELY, OF ALLENTOWN, PENNSYLVANIA.

BRAKE MECHANISM.

1,386,559.     Specification of Letters Patent.     Patented Aug. 2, 1921.

Application filed December 10, 1920. Serial No. 429,752.

*To all whom it may concern:*

Be it known that I, JOHN P. FEGELY, a citizen of the United States, and a resident of Allentown, in the county of Lehigh and State of Pennsylvania, have invented a new and useful Brake Mechanism, of which the following is a specification.

This invention relates to brake mechanisms.

The primary object of this invention is to provide a brake or analogous device with means for automatically taking up any slack or play between the brakes and their operating means.

Further, it is an object of the invention to provide a brake mechanism wherein the brake rod may be adjusted in order to take up any slack or play that may occur in the same.

Another important object of the invention resides in the provision of a brake mechanism including an elastic connection between the brake operating means and the brake proper, thus obviating applying the brakes too strenuously, but which will cause the brake proper to gradually engage the rotating member.

With the preceding and other objects and advantages in mind, the invention consists in the novel combination of elements, construction and arrangement of parts and operations which will be hereinafter more fully referred to, claimed and illustrated in the accompanying drawing, wherein:

Figure 1 is a fragmentary side elevation of a motor vehicle showing the device associated with the motor vehicle brakes;

Fig. 2 is a view, partly in longitudinal cross section and partly in elevation of the device detached from the brakes; and Fig. 3 is a transverse sectional view taken on line 3—3 of Fig. 2.

Referring in detail to the drawing wherein like characters of reference designate like parts throughout the several views, the numeral 5 designates a motor vehicle which includes the usual brake band 6 operated by the usual link 7 which, in turn, is operatively connected with a brake rod 8.

The numeral 9 designates a cylinder threaded at its opposite ends, and threaded on these ends are caps 10 the latter being retained against accidental rotation by set screws 11. The brake rod 8 passes centrally through one of the caps 10, and threaded upon this end of the rod and engaging the cap is a nut 12 which operatively connects the brake rod with this cap 10.

A rod 13 passes centrally through the cap 10 at the opposite end of the cylinder and projects within the latter. Held between jam nuts 14 and mounted on the rod 13 is a disk 15. Encircling the rod 13 and engaging the adjacent cap 10 and the disk 15 is an expansible and relatively heavy coil spring 16. The outer end of this rod 13 is threaded, and in order to regulate the tension of the spring 16 and to take up slack in the brake rod, an adjusting nut 17 is threaded thereon. In order to retain the adjusting nut 17 in set position, a lock nut 18 is threaded upon this rod 13.

Threaded on the threaded end of the rod 13 is a yoke or lever connection 19 which is pivotally connected with the operating lever designated at 20. In this connection, it will be stated that the connection 19 may be connected with the usual foot lever instead of connecting it with the hand lever, as illustrated in this instance. An adjusting nut 21 is also threaded upon the rod 13 whereby to retain the yoke or lever connection 19 in adjusted position.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with a brake mechanism including a brake band, an operating rod operatively connected therewith and a pivoted operating lever, of a cylinder open at both ends, caps removably mounted on the ends of the cylinder, one of which being operatively connected with one end of the brake rod, a relatively short rod extending through the other cap and into the cylinder and having one end pivotally connected with the brake lever, an abutment member carried by the inner end of said rod, and an expansible coil spring encircling the rod and engaging the abutment member and one cap.

2. The combination with a brake mechanism including a brake band, an operating lever and a pivoted operating rod, of a cylinder arranged on the operating rod, caps arranged on the ends of the cylinder, the operating rod being extended through one of the caps, a nut engaged thereon and engaging said cap, a rod slidably passing through the other cap and having one end threaded, an abutment member on the inner end of the rod, an expansible coil spring engaging the latter and the last mentioned cap, an adjusting nut threaded on the rod whereby to regulate the length of the latter and to govern the tension of the spring, a lock nut threaded on the rod for holding the adjusting nut in set position, a bifurcated member also threaded on the rod and having pivotal connection with the operating lever, and a second lock nut on the rod for retaining the bifurcated member in adjusted position.

JOHN P. FEGELY.